United States Patent [19]

Earp

[11] 3,725,786

[45] Apr. 3, 1973

[54] SYSTEM FOR DISCRETE MARKING AND DETECTING A PREDETERMINED POINT IN TIME WITHIN THE ENVELOPE OF A PULSE MODULATED CARRIER

[75] Inventor: Charles William Earp, London, N.W. 3, England

[73] Assignee: International Standard Electric Corporation, New York, N.Y.

[22] Filed: Feb. 16, 1971

[21] Appl. No.: 115,214

[30] Foreign Application Priority Data

Mar. 5, 1970 Great Britain..................10,624/70

[52] U.S. Cl. ...............325/15, 325/115, 325/321, 325/141, 343/13 R
[51] Int. Cl..............................................H04b 1/38
[58] Field of Search....325/48, 49, 137, 138, 15, 115, 325/321, 141; 343/7 A, 7.7, 13 R

[56] References Cited

UNITED STATES PATENTS

| | | | |
|---|---|---|---|
| 3,229,230 | 1/1966 | Feldman | 325/138 |
| 3,217,256 | 11/1965 | Palatinus | 325/138 |
| 1,789,364 | 1/1931 | Hansell | 325/138 |
| 3,215,953 | 11/1965 | Barret | 325/138 |

Primary Examiner—Albert J. Mayer
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

The radiator pulse of an aircraft distance measuring equipment is characterized by a radio frequency phase reversal at its mid-point in time, hence producing a sharp cusp of zero amplitude which is more easily identified and measured than the leading edge.

5 Claims, 6 Drawing Figures

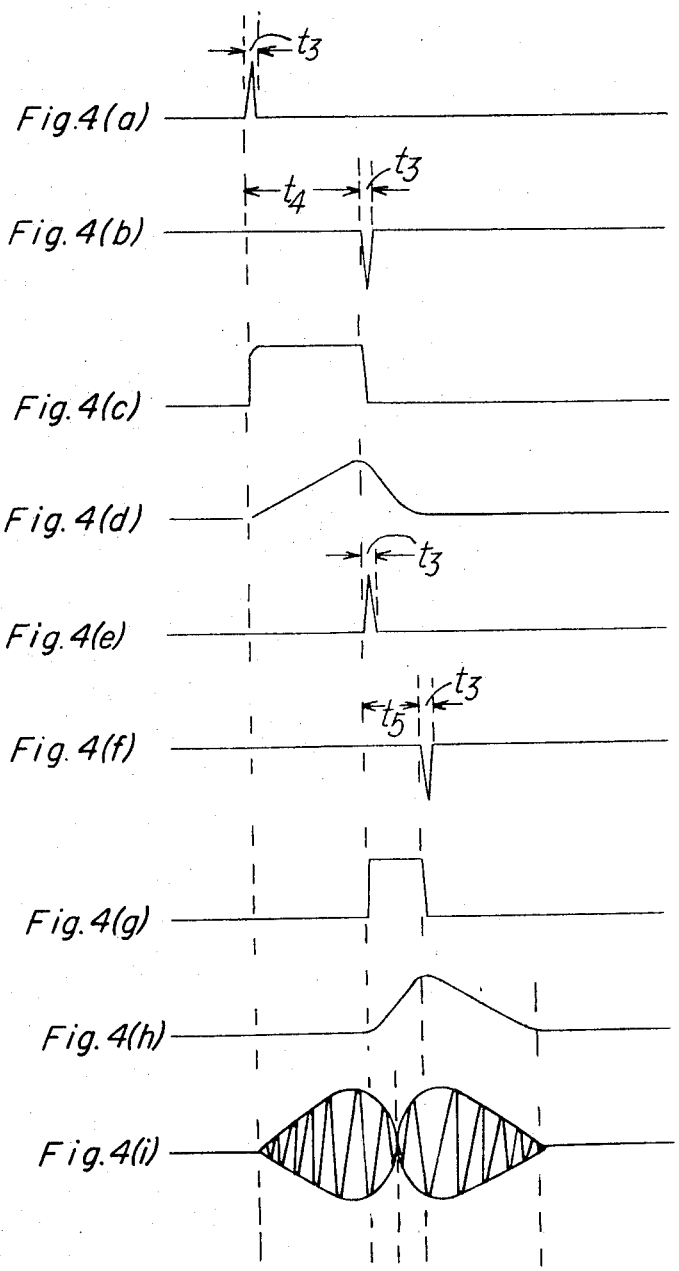

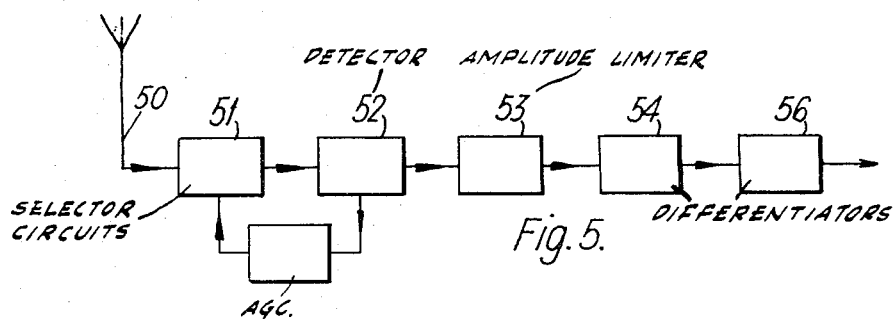
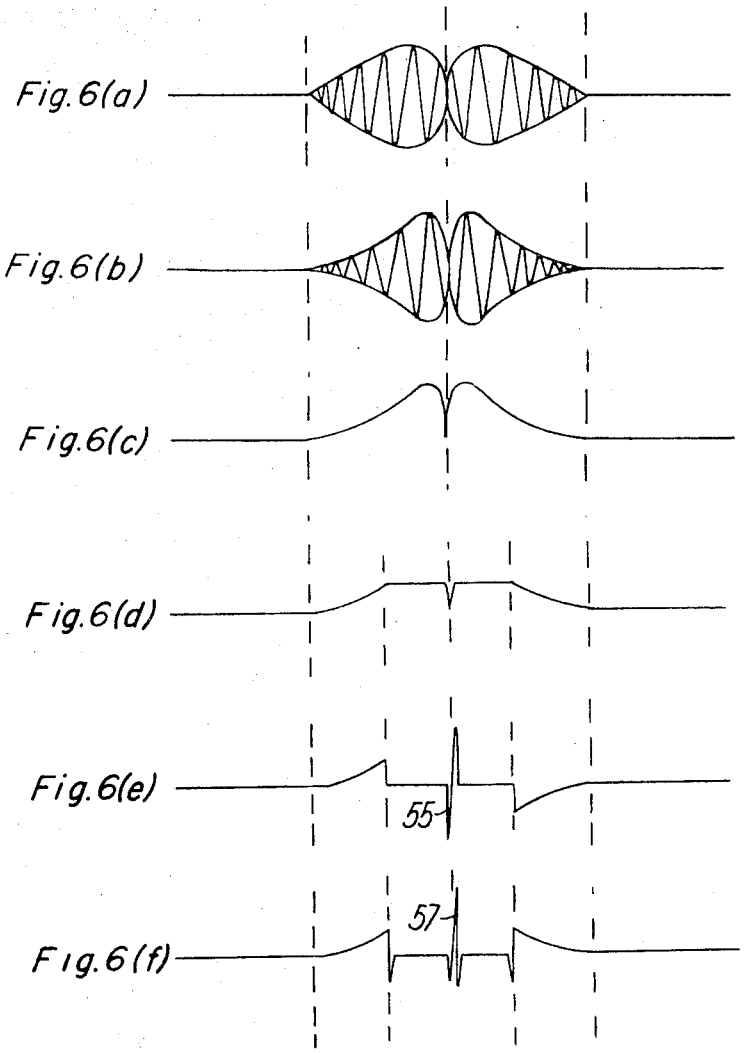

SYSTEM FOR DISCRETE MARKING AND DETECTING A PREDETERMINED POINT IN TIME WITHIN THE ENVELOPE OF A PULSE MODULATED CARRIER

BACKGROUND OF THE INVENTION

This invention relates to radio transmitters and to equipment using radio transmitters.

In distance measurement equipment (DME) as typified by aircraft DME, the aircraft interrogates a ground beacon by transmitting radio frequency pulses which are detected and repeated by the beacon on a different frequency. The repeated pulses are detected by the aircraft, and the time difference between transmitted pulses and received pulses is representative of distance from the ground beacon.

Accuracy is obtained by the use of very short pulses, measurement normally being made on the leading edges of the pulses. In conventional DME, frequency bandwidth is not adequate for exceedingly short pulses and is not adequate for very high precision.

SUMMARY OF THE INVENTION

It is an object of the present invention to obtain very precise amplitude marking of the radio frequency pulses without involving the use of a very large frequency-bandwidth.

According to a broad aspect of the invention there is provided a radio transmitter comprising means for generating a radio frequency carrier wave, means for amplitude modulating said carrier wave to produce a series of pulses with each of said pulses having an envelope which is cusped at an intermediate point at a substantially zero amplitude level and wherein said radio frequency carrier wave undergoes a phase reversal at said intermediate point and means for transmitting said pulses of said radio frequency carrier wave.

The invention will now be described with reference to the accompanying drawings.

BRIEF DESCRIPTION OF THE DRAWINGS

FIG. 4(a–i) shows waveforms for explaining the operation of the transmitter of FIG. 3;

FIG. 5 shows a radio receiver for receiving the pulses transmitted by either of the transmitters shown in FIGS. 1 and 3 and suitable for use in aircraft DME; and FIG. 6(a–f) shows waveforms for explaining the operation of the receiver of FIG. 5.

DESCRIPTION OF THE PREFERRED EMBODIMENTS

Figure 1:
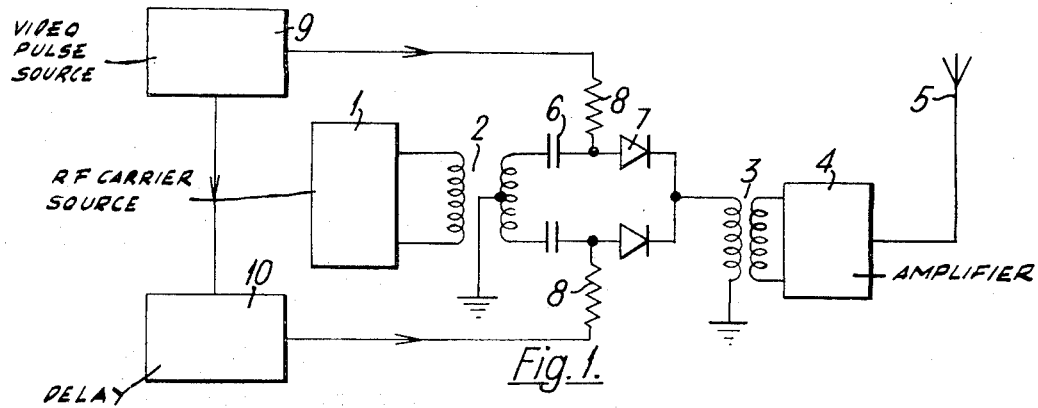
FIG. 1 shows a radio transmitter for transmitting radio frequency pulses and suitable for use in aircraft DME.

Referring to FIG. 1 a radio frequency carrier wave source 1 is coupled via an input transformer 2 having a center tapped secondary winding connected at its ends to similar arms of a balanced modulator, the junction of said arms being connected to earth via a primary winding of an output transformer 3, the secondary winding of which is connected via a suitable amplifier 4 to an aerial 5.

Each of the modulator arms comprises a capacitor 6 in series with a diode 7, the diodes 7 being similarly directed for both arms, with a pair of similar load resistors 8 for the modulating inputs each connected between the capacitor and diode of the respective modulator arm.

A video pulse source 9 is connected directly to one modulating input and via a delay network 10 to the other modulating input.

Figure 2A:
FIG. 2(a–c) shows waveforms for explaining the operation of the transmitter of FIG. 1.
Figure 2B:
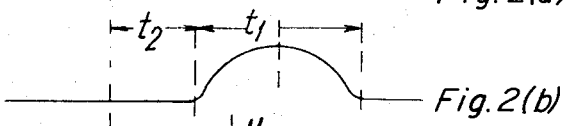

In operation, the pulse source 9 produces a series of D.C. pulses each of a duration $t_1$ of $2\mu$ sec and each having a shape as shown in FIG. 2(a). This pulse is delayed by the delay network 10 by a time $t_2$ of $1\mu$ sec, and the delayed pulse has a timing and shape as shown in FIG. 2(b).

Figure 2C:
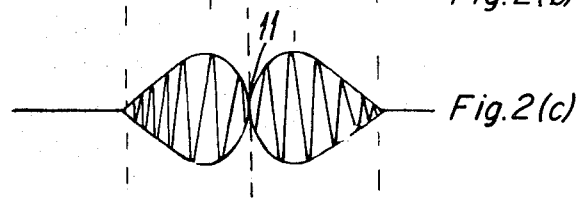

The two pulses operate on the RF modulator to yield pulses of opposite RF phase, but overlapping in time, hence delivering a modulator output of the RF "double" pulse as shown in FIG. 2(c). The modulator output is therefore a series of pulses with each pulse having an envelope which is cusped at the mid-point 11 at substantially zero amplitude level, with the carrier wave undergoing a phase reversal at the mid-point 11.

These pulses are amplified by the amplifier 4 to a sufficient level for transmission via the aerial 5.

Figure 3:
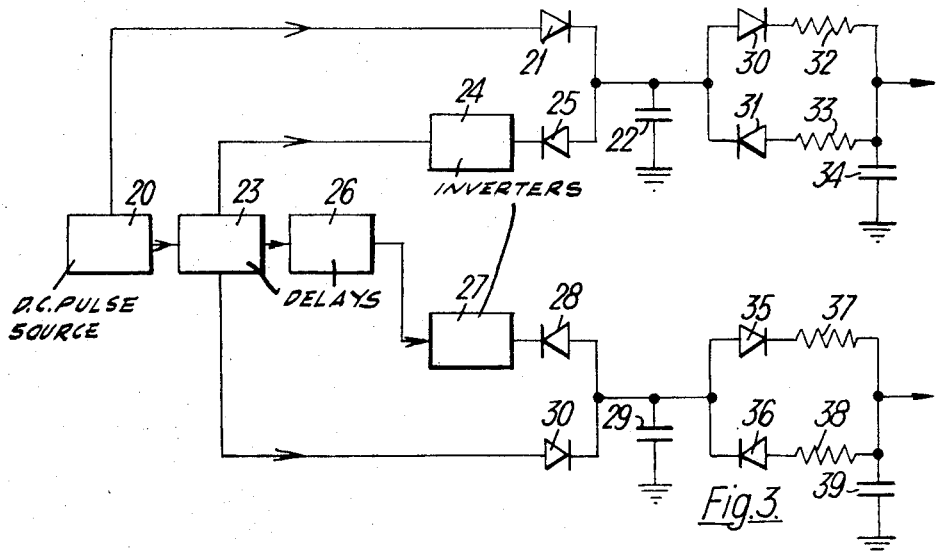
FIG. 3 shows an alternative form of aircraft DME radio pulse transmitter.

FIG. 3 shows a more refined modulating input arrangement, for producing a sharper cusp in the final transmitted pulses. The carrier wave source, balanced modulator, pulse amplifier and aerial are the same as for FIG. 1 and have not been shown in FIG. 3.

A D.C. pulse source 20 for generating a series of short pulses each of duration $t_3$ of $0.1\mu$ sec, has a first output connected via a forward poled diode 21 to a grounded-capacitor 22. A second output of the source 20 is connected to a first delay network 23 having a delay time $t_4$ of $1\mu$ sec.

A first output of the delay network 23 is connected via an inverter 24 and a diode 25, oppositely poled to the diode 21 to the capacitor 22. A second output of the delay network 23 is connected via a second delay network 26 having a delay time $t_5$ of $0.5\mu$ sec, an inverter 27 and a diode 28, poled as the diode 25, to a grounded-capacitor 29 of equal capacitance to the capacitor 22. A third output of the delay network 23 is connected via a diode 30, oppositely poled to the diode 28, to the capacitor 29.

Connected to the capacitor 22 is a first pulse shaping circuit comprising two parallel arms each containing a diode in series with a resistor. The diodes 30 and 31 are oppositely poled, and the resistor 32 has a resistance value (R) which is large compared with the resistance value (r) of the resistor 33. The common end of the arms remote from the capacitor 22 is connected to a grounded capacitor 34 and to one modulating input of the rf modulator.

Connected to the capacitor 29 is a second pulse shaping circuit similarly comprising two parallel diode-resistor arms, (35, 37 and 36, 38) connected to a grounded capacitor 39 of equal capacitance to that of the capacitor 34, with resistor 37 having a resistance value of r and resistor 38 having a resistance value of R.

Referring additionally to FIG. 4, in operation each $0.1\mu$ sec pulse from the source 20, FIG. 4(a), as applied via the diode 21 to the capacitor 22 and followed after $1\mu$ sec delay by the first delay network 23 and inversion by the inverter 24, FIG. 4(b), causes a substantially rectangular 1μ sec voltage excursion at the capacitor 22, (FIG. 4(c)).

This voltage excursion via the diode 30 resistor 32 arm during the excursion and the diode 31 and resistor 33 arm at the end of the excursion, and capacitor 34, causes a modulating input as shown in the waveform of FIG. 4(d) to be applied to one side of the modulator, with an exponential rise over 1μ sec followed by a sharper exponential decay due to r being less than R.

After its 1μ sec delay by delay network 23, the original 0.1μ sec pulse FIG. 4(e) is applied via the diode 30 to the capacitor 29. After a further delay of 0.5μ sec by the delay network 27 and inversion by the inverter 27, a pulse, FIG. 4(f) is applied via the diode 28 to the capacitor 29.

The resulting 0.5μ sec voltage excursion, FIG. 4(g) of the capacitor 29 causes, via the second pulse shaping circuit with its inverse resistance values, a modulating input as shown in FIG. 4(h) to be applied to the other, anti-phase, side of the modulator.

The resulting transmitted pulse is shown in FIG. 4(i) having an envelope which is cusped at the mid-point at substantially zero amplitude level with the carrier wave undergoing a phase reversal at the mid-point.

A suitable radio receiver for the utilization of the transmitted phase reversed pulses is shown in FIG. 5, and comprises a receiving aerial 50, whereat the envelope of the transmitted pulse is as shown in FIG. 6(a), feeding conventional selective circuits 51 the output from which is as shown in FIG. 6(b) with rather slower build-up at commencement and final decay after passing through the selective circuits due to typical bandwidth limitation.

The output from the selective circuits 51 passes through a detector 52 with an AGC loop to the selective circuits; and FIG. 6(c) shows the detected DC pulse limited by positive amplitude limitation by limiter 53. The DC pulse then is fed to a differentiator 54 whose output is shown in FIG. 6(e). The necessary estimate of time position of the pulse is now identified by the negative-going edge 55.

A second differentiator 56 may be provided, whose output is shown in FIG. 6(f) for a still more positive indication of the time of occurrence, at positive going edge 57, of the original sharp cusp of the transmitted pulse.

In aircraft DME, the aircraft has a radio frequency pulse transmitter, as already described, for transmitting the required series of phase reversed pulses, a ground beacon has a receiver responsive to the aircraft transmitted pulses to cause operation of a beacon transmitter, operating on a different carrier frequency to transmit a return phase reversed pulse for each received pulse, and the aircraft has a radio receiver for determining the time of occurrence of the cusp of the beacon transmitted pulse, together with means for determining the difference in time between the transmission of the pulse from the aircraft and the reception of the beacon-transmitted pulse, in order to establish the distance of the aircraft from the beacon.

It is to be understood that the foregoing description of specific examples of this invention is made by way of example only and is not to be considered as a limitation on its scope.

I claim:

1. A pulsed radio transmitting and receiving system for discrete marking of a predetermined point in time during the envelope of a transmitted pulse and discrete identification of said marking in corresponding relationship to the pulse received at a remote location from the point of transmission of said transmitted pulse, comprising:
   source means within the transmitter for generating a radio frequency carrier wave;
   means for amplitude modulating said carrier wave to produce a series of pulses each having an envelope shape cusped at said predetermined point in time, said cusped point extending substantially to zero amplitude within said envelope, said modulating means further including means to produce a phase reversal of said carrier wave after said cusp within each of said pulse envelopes;
   means for radiating said pulse modulated carrier pulses toward the receiver of said system;
   means within said receiver for envelope detecting and limiting said pulses;
   and differentiating means responsive to said limiting means for producing a relatively sharp pulse corresponding to the cusp in the envelope waveform from the output of said limiting means.

2. Apparatus according to claim 1 in which said differentiating means includes a first differentiator for producing a bipolar differentiated wave representative of the rate of change of said detected envelope waveform at the time of said cusp, and a second differentiator responsive to the output of said first differentiator for producing a predominately unipolar pulses representative of the rate of change of said bipolar wave, thereby to more discretely mark said predetermined point in time within the corresponding received pulse.

3. Apparatus according to claim 1 in which said means within said transmitter for amplitude modulating said carrier wave comprises:
   a balanced radio frequency modulator responsive to said source means and having first and second modulating signal inputs adapted to modulate said carrier wave in first and second opposite radio frequency phases;
   first and second sources of modulating pulses of substantially the same duration and polarity but relatively shifted in time to partially overlap;
   and means applying said first and second sources of modulating pulses to said first and second modulating signal inputs of said balanced modulator, thereby to produce said cusp in the envelope of said amplitude modulated carrier.

4. Apparatus according to claim 3 including a common source of DC pulses to provide said first source of modulating pulses, and including delay means responsive to said common source of DC pulses to produce said second source of modulating pulses.

5. Apparatus according to claim 3 in which said differentiating means includes a first differentiator for producing a bipolar differentiated wave representative of the rate of change of said detected envelope waveform at the time of said cusp, and a second differentiator responsive to the output of said first differentiator for producing a predominately unipolar pulse representative of the rate of change of said bipolar wave, thereby to more discretely mark said predetermined point in time within the corresponding received pulse.

* * * * *